(12) United States Patent
Letts et al.

(10) Patent No.: US 12,006,414 B2
(45) Date of Patent: Jun. 11, 2024

(54) PROCESS FOR PRODUCING ISOCYANATE-BASED FOAM CONSTRUCTION BOARDS

(71) Applicant: Holcim Technology Ltd., Zug (CH)

(72) Inventors: John B. Letts, Carmel, IN (US); Chunhua Yao, Carmel, IN (US); Michael J. Hubbard, Goshen, IN (US)

(73) Assignee: Holcim Technology Ltd, Zug (CH)

( * ) Notice: Subject to any disclaimer, the term of this patent is extended or adjusted under 35 U.S.C. 154(b) by 7 days.

(21) Appl. No.: 17/521,192

(22) Filed: Nov. 8, 2021

(65) Prior Publication Data
US 2022/0056234 A1 Feb. 24, 2022

Related U.S. Application Data (62) Division of application No. 16/326,394, filed as application No. PCT/US2017/047819 on Aug. 21, 2017, now abandoned.
(Continued)

(51) Int. Cl.
*C08J 9/14* (2006.01)
*B32B 5/18* (2006.01)
(Continued)

(52) U.S. Cl.
CPC ............. *C08J 9/141* (2013.01); *B32B 5/18* (2013.01); *B32B 5/20* (2013.01); *B32B 5/32* (2013.01);
(Continued)

(58) Field of Classification Search
None
See application file for complete search history.

(56) References Cited

U.S. PATENT DOCUMENTS 3,558,531 A 1/1971 Salyer
4,425,446 A 1/1984 Malwitz et al.
(Continued)

FOREIGN PATENT DOCUMENTS

CA 2886641 A1 4/2014
CA 3034242 2/2018
(Continued)

OTHER PUBLICATIONS

Zhang, Jiafei. (2013). Study on CO2 Capture USing Thermomorphic Biphasic Solvents with Energy-Efficient Regeneration. Technische Universitat Dortmund (2013).
(Continued)

*Primary Examiner* — Chinessa T. Golden
(74) *Attorney, Agent, or Firm* — Renner, Kenner; Arthur M. Reginelli (57) ABSTRACT

A process for producing a polyurethane or polyisocyanurate construction board, the process comprising of providing an A-side reactant stream that includes an isocyanate-containing compound; providing a B-side reactant stream that includes a polyol, where the B-side reactant steam includes a blowing agent mixture including isopentane and a blowing agent additive that has a Hansen Solubility Parameter ($\delta_t$) that is greater than 15 $MPa^{0.5}$; and mixing the A-side reactant stream with the B-side reactant stream to produce a reaction mixture.

22 Claims, 3 Drawing Sheets

Related U.S. Application Data (60) Provisional application No. 62/377,081, filed on Aug. 19, 2016.

(51) Int. Cl.

| | | |
|---|---|---|
| *B32B 5/20* | (2006.01) | |
| *B32B 5/32* | (2006.01) | |
| *B32B 7/12* | (2006.01) | |
| *B32B 9/04* | (2006.01) | |
| *B32B 11/04* | (2006.01) | |
| *B32B 13/04* | (2006.01) | |
| *B32B 15/04* | (2006.01) | |
| *B32B 21/04* | (2006.01) | |
| *B32B 25/04* | (2006.01) | |
| *B32B 27/06* | (2006.01) | |
| *B32B 27/30* | (2006.01) | |
| *B32B 27/32* | (2006.01) | |
| *C08G 18/08* | (2006.01) | |
| *E04B 1/80* | (2006.01) | |
| *E04C 2/20* | (2006.01) | |
| *E04C 2/296* | (2006.01) | |
| *E04D 3/35* | (2006.01) | |
| *E04D 11/02* | (2006.01) | |
| *B29C 44/12* | (2006.01) | |
| *B29K 75/00* | (2006.01) | |
| *B29K 105/04* | (2006.01) | |
| *B29L 31/10* | (2006.01) | |

(52) U.S. Cl.
CPC ................ *B32B 7/12* (2013.01); *B32B 9/04* (2013.01); *B32B 9/043* (2013.01); *B32B 9/045* (2013.01); *B32B 11/048* (2013.01); *B32B 13/045* (2013.01); *B32B 15/046* (2013.01); *B32B 21/047* (2013.01); *B32B 25/045* (2013.01); *B32B 27/065* (2013.01); *B32B 27/304* (2013.01); *B32B 27/32* (2013.01); *C08G 18/08* (2013.01); *C08J 9/149* (2013.01); *E04B 1/80* (2013.01); *E04C 2/205* (2013.01); *E04C 2/296* (2013.01); *E04D 3/352* (2013.01); *E04D 11/02* (2013.01); *B29C 44/12* (2013.01); *B29K 2075/00* (2013.01); *B29K 2105/046* (2013.01); *B29K 2995/0015* (2013.01); *B29L 2031/10* (2013.01); *B32B 2250/03* (2013.01); *B32B 2250/40* (2013.01); *B32B 2266/0214* (2013.01); *B32B 2266/0278* (2013.01); *B32B 2307/304* (2013.01); *B32B 2307/3065* (2013.01); *B32B 2307/71* (2013.01); *B32B 2307/72* (2013.01); *B32B 2419/00* (2013.01); *B32B 2419/06* (2013.01); *C08G 2110/0025* (2021.01); *C08J 2201/022* (2013.01); *C08J 2203/14* (2013.01); *C08J 2203/182* (2013.01); *C08J 2205/052* (2013.01); *C08J 2207/00* (2013.01); *C08J 2375/04* (2013.01)

(56) References Cited

U.S. PATENT DOCUMENTS

| | | |
|---|---|---|
| 4,572,865 A | 2/1986 | Gluck et al. |
| 5,096,933 A | 3/1992 | Volkert |
| 5,100,925 A | 3/1992 | Watson et al. |
| 5,166,182 A | 11/1992 | Blanpied |
| 5,278,195 A | 1/1994 | Vollkert |
| 5,336,696 A | 8/1994 | Ashida |
| 5,416,130 A | 5/1995 | Liman |
| 5,484,818 A * | 1/1996 | De Vos .............. C08G 18/2885 521/131 |
| 5,547,998 A | 8/1996 | White |
| 5,624,969 A | 4/1997 | Seifert et al. |
| 5,801,210 A | 9/1998 | Radovich et al. |
| 5,981,612 A | 11/1999 | Keppeler et al. |
| 8,309,619 B2 | 11/2012 | Handa |
| 9,522,973 B2 | 12/2016 | Combs |
| 2003/0013777 A1 | 1/2003 | Thornsberry et al. |
| 2004/0087674 A1 | 5/2004 | Letts |
| 2005/0159500 A1 | 7/2005 | Dreier et al. |
| 2006/0100295 A1 | 5/2006 | Heraldo et al. |
| 2008/0097126 A1 | 4/2008 | Karl |
| 2008/0313985 A1 | 12/2008 | Duncan |
| 2009/0247657 A1 | 10/2009 | Kaplan et al. |
| 2011/0124756 A1 | 5/2011 | Singh |
| 2011/0263732 A1 | 10/2011 | Ramesh |
| 2014/0066532 A1 | 4/2014 | Combs et al. |
| 2014/0094530 A1 | 4/2014 | Combs et al. |
| 2015/0118476 A1* | 4/2015 | Bertucelli ........... B29C 44/1233 264/46.5 |
| 2015/0329690 A1 | 11/2015 | Mukaiyama |
| 2016/0090460 A1 | 3/2016 | Singh et al. |
| 2016/0130213 A1 | 5/2016 | Narayan et al. |
| 2019/0225766 A1 | 7/2019 | Letts et al. |

FOREIGN PATENT DOCUMENTS

| | | |
|---|---|---|
| EP | 3095810 A2 | 11/2016 |
| EP | 3500621 A1 | 6/2019 |

OTHER PUBLICATIONS

Barton, Allan M.F. (1991). CRC Handbook of Solubility Parameters and Other Cohesion Parameters, Second Edition. CRC Press (Year: 1991).
International Search Report and Written Opinion for Intl. Appl. No. PCT/US2016/064867 dated Mar. 28, 2017. pp. 1-9.
International Search Report and Written Opinion for Intl. Appl. No. PCT/US2017/047819 dated Nov. 22, 2017, pp. 1-13.
International Search Report and Written Opinion for Intl. Appl. No. PCT/US2018/023134 dated Jul. 31, 2018, pp. 1-14.
U.S. Appl. No. 15/350,634.
U.S. Appl. No. 15/779,887.
U.S. Appl. No. 15/602,852.
U.S. Appl. No. 16/326,394.
U.S. Appl. No. 16/209,038.
U.S. Appl. No. 16/209,218.
U.S. Appl. No. 16/492,487.
U.S. Appl. No. 15/925,592.
U.S. Appl. No. 16/441,406.

\* cited by examiner

PROCESS FOR PRODUCING ISOCYANATE-BASED FOAM CONSTRUCTION BOARDS

This application is a divisional application of U.S. Non-Provisional application Ser. No. 16/326,394 filed on Feb. 19, 2019, which is a National-Stage Application of PCT/US2017/047819 filed on Aug. 21, 2017, which claims the benefit of U.S. Provisional Application Ser. No. 62/377,081 filed on Aug. 19, 2016, which are incorporated herein by reference.

FIELD OF THE INVENTION

Embodiments of the present invention are directed toward a process for producing isocyanate-based foam construction boards (e.g., polyurethane and polyisocyanurate boards) having improved physical properties and improved insulating properties, while maintaining foam characteristics that are conducive to construction board manufacture. In one or more embodiments, the construction boards are prepared by employing isopentane as the major blowing agent component in combination with a blowing agent additive.

BACKGROUND OF THE INVENTION

Polyurethane and polyisocyanurate foam construction boards are commonly employed in the construction industry. For example, foam insulation boards are commonly employed as insulation within flat or low-sloped roofs. Isocyanate-based cover boards, which are high density boards, are also employed in many roof systems as a protective layer.

Isocyanate-based construction boards are cellular in nature and typically include an insulating compound trapped within the closed cells of the foam. Many insulating compounds have been used over the years. For example, halogenated hydrocarbons, such as trichlorofluoromethane (CFC-11), were employed. These materials were phased out in favor of hydrochlorofluorocarbons, such as 1,1-dichloro-1-fluoroethane (HCFC-141b). The hydrochlorofluorocarbons were then replaced with hydrocarbons such as various pentane isomers. For example, it is common to produce construction boards by employing n-pentane, isopentane, and/or cyclopentane as blowing agents.

Construction boards are often characterized by one or more technologically important characteristics. For example, the isocyanate-based construction boards may be characterized by an ISO index, which generally refers to the molar ratio of polyisocyanurate (PIR) to polyurethane (PUR) linkages within a given foam system. Typically, the ISO index is determined by IR spectroscopy using standard foams of known index. Where, for example, the PIR/PUR ratio is 2, the foam is designated with an index of 200. Insulation and cover boards having an index of greater than about 200 are desirable because these foam construction boards demonstrate improved dimensional stability and better flame resistance than lower index foams.

It is obviously desirable to increase the insulating ability of the foam construction boards without drastically altering other characteristics of the board such as the thickness. In particular, there is a desire to maintain the insulating properties of construction boards over longer periods of time.

SUMMARY OF THE INVENTION

Embodiments of the invention provide a process for producing a polyurethane or polyisocyanurate construction board, the process comprising (i) providing an A-side reactant stream that includes an isocyanate-containing compound; (ii) providing a B-side reactant stream that includes a polyol, where the B-side reactant stream includes a blowing agent mixture including isopentane and a blowing agent additive that has a Hansen Solubility Parameter (δt) that is greater than 15 MPa$^{0.5}$; and (iii) mixing the A-side reactant stream with the B-side reactant stream to produce a reaction mixture.

Other embodiments of the invention provide a process for producing a polyurethane or polyisocyanurate construction board, the process comprising (i) combining polyol, isocyanate, isopentane, and a blowing agent additive that has a Hansen Solubility Parameter (δt) that is greater than 15 MPa$^{0.5}$ to form a foam-forming mixture; (ii) depositing the foam-forming mixture on a facer; and (iii) heating the foam-forming mixture to form a closed-cell foam.

DETAILED DESCRIPTION OF ILLUSTRATIVE EMBODIMENTS

Embodiments of the present invention are based, at least in part, on the discovery of a process for producing isocyanate-based construction boards that employ a blowing agent that includes isopentane and a blowing agent additive. In one or more embodiments, isopentane is a major component of the blowing agent. In one or more embodiments, the blowing agent additive has a Hansen Solubility Parameter ($δ_t$) that is greater than 15 MPa$^{0.5}$. In particular embodiments, the blowing agent (i.e. the isopentane and the blowing agent additive) is included in the isocyanate-reactive stream of reactants (which is often referred to as the B-side stream), which stream is then combined with the isocyanate compounds (which are contained in an A-side stream) during formation of the foam. While it has been observed that the use of a blowing agent or blowing agent mixture including higher levels of isopentane can be extremely difficult to process and therefore hinder the ability to manufacture construction boards, it has unexpectedly been discovered that the use of certain blowing agent additives allow for the use of higher percentages of isopentane while maintaining processability. As a result, construction boards having greater dimensional stability and improved insulating properties can be manufactured.

PROCESS OVERVIEW

As suggested above, practice of the present invention includes preparing an isocyanate-based foam by employing isopentane blowing agent and a blowing agent additive. As used herein, the term isocyanate-based foam may include polyurethane and polyisocyanurate foams, and terms foam, polyurethane and polyisocyanate may be generally used interchangeably unless specifically indicated. For example, where a technical distinction must be made between polyurethane and polyisocyanurate foam, the ISO index will be used to make any required technical distinctions.

In one or more embodiments, the foam is prepared by mixing a first stream that includes an isocyanate-containing compound with a second stream that includes an isocyanate-reactive compound. Using conventional terminology, the first stream (i.e., the stream including an isocyanate-containing compound) may be referred to as an A-side stream, an A-side reactant stream, or simply an A stream. Likewise, the second stream (i.e., the stream including an isocyanate-reactive compound) may be referred to as a B-side stream, B-side reactant stream, or simply B stream. In one or more embodiments, either stream may carry additional ingredients including, but not limited to, flame-retardants, surfactants, blowing agents, catalysts, emulsifiers/solubilizers, fillers, fungicides, anti-static substances, and mixtures of two or more thereof.

In one or more embodiments, the isopentane and blowing agent additive are included within the B-side stream of reactants. In alternate embodiments, the isopentane and blowing agent additive may be included within the A-side stream of reactants. In yet other embodiments, the isopentane and blowing agent additive may be included within both the A-side and B-side stream of reactants.

A-Side Stream

In one or more embodiments, the A-side stream may only contain the isocyanate-containing compound. In one or more embodiments, multiple isocyanate-containing compounds may be included in the A-side. In other embodiments, the A-side stream may also contain other constituents such as, but not limited to, flame-retardants, surfactants, blowing agents and other non-isocyanate-reactive components. In one or more embodiments, the complementary constituents added to the A-side are non-isocyanate reactive. And, as suggested above, the A-side may include the blowing agent mixture in accordance with the present invention, especially where the blowing agent additive is non-reactive with the isocyanates. In other embodiments, the A-side is devoid or substantially devoid of the blowing agent and blowing agent additive.

Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanates (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

B-Side Stream

In one or more embodiments, the B-side stream may only include the isocyanate-reactive compound. In one or more embodiments, multiple isocyanate-reactive compounds may be included in the B-side. In other embodiments, the B-side stream may also contain other constituents such as, but not limited to, water, flame-retardants, surfactants, and other non-isocyanate-containing components. In particular embodiments, the B-side includes an isocyanate reactive compound, isopentane and the blowing agent additive. In these or other embodiments, the B-side may also include flame retardants, catalysts, emulsifiers/solubilizers, surfactants, fillers, fungicides, anti-static substances, and other ingredients that are conventional in the art.

An exemplary isocyanate-reactive compound is a polyol. The term polyol, or polyol compound, includes diols, polyols, and glycols, which may contain water as generally known in the art. Primary and secondary amines are suitable, as are polyether polyols and polyester polyols. In particular embodiments, aromatic polyester polyols are employed. Exemplary polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts

Catalysts, which are believed to initiate the polymerization reaction between the isocyanate and the polyol, as well as a trimerization reaction between free isocyanate groups when polyisocyanurate foam is desired, may be employed. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, Emulsifiers and Solubilizers

Surfactants, emulsifiers, and/or solubilizers may also be employed in the production of polyurethane and polyisocyanurate foams in order to increase the compatibility of the blowing agents with the isocyanate and polyol components. Surfactants may serve two purposes. First, they may help to emulsify/solubilize all the components so that they react completely. Second, they may promote cell nucleation and cell stabilization.

Exemplary surfactants include silicone co-polymers or organic polymers bonded to a silicone polymer. Although surfactants can serve both functions, it may also be useful to ensure emulsification/solubilization by using enough emulsifiers/solubilizers to maintain emulsification/solubilization and a minimal amount of the surfactant to obtain good cell nucleation and cell stabilization. Examples of surfactants include Pelron surfactant 9920, Evonik B8489, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame Retardants

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris(cloro-propyl) phosphate), tri-2-chloroethyl phosphate (a.k.a tris(chloro-ethyl) phosphate), phosphonic acid, methyl ester, dimethyl ester, and diethyl ester. U.S. Pat. No. 5,182,309 is incorporated herein by reference to show useful blowing agents.

Blowing Agent Mixture

As suggested above, the blowing agent employed in the manufacture of construction boards according to the present invention includes a mixture of isopentane and a blowing agent additive. In one or more embodiments, the blowing agent mixture includes at least 55 wt %, in other embodiments at least 60 wt %, in other embodiments at least 65 wt %, in other embodiments at least 70 wt %, in other embodiments at least 72 wt %, in other embodiments at least 75 wt %, in other embodiments at least 77 wt %, in other embodiments at least 80 wt %, in other embodiments at least 82 wt %, in other embodiments at least 85 wt %, in other embodiments at least 87 wt %, and in other embodiments at least 90 wt % isopentane with the balance of the mixture including one or more blowing agent additives as defined herein. In one or more embodiments, the blowing agent mixture is substantially devoid of n-pentane and cyclopentane, where substantially devoid refers to that amount or less that would otherwise have an appreciable impact on the manufacture of construction boards or the properties of the construction boards according to embodiments of the present invention. In one or more embodiments, the blowing agent mixture is devoid of n-pentane and cyclopentane. In one or more embodiments, the manufacture of construction boards according to one or more embodiments of the present invention employs less than 5%, in other embodiments less than 2%, in other embodiments less than 1%, and in other embodiments less than 0.5 wt % n-pentane or cyclopentane based on the total weight of all of the foam forming ingredients or constituents.

Blowing Agent Additive

In one or more embodiments, the blowing agent additive is an organic compound having a Hansen Solubility Parameter ($\delta_t$) that is greater than 15.0, in other embodiments greater than 15.5, in other embodiments greater than 16.0, in other embodiments greater than 16.5, in other embodiments greater than 17.0, in other embodiments greater than 17.5, in other embodiments greater than 18.0, and in other embodiments greater than 18.5 MPa$^{0.5}$ at 25° C. In these or other embodiments, the blowing agent additive is an organic compound having a Hansen Solubility Parameter ($\delta_t$) of from about 15.0 to about 35.0, in other embodiments from about 15.5 to about 33.0, in other embodiments from about 16.0 to about 30.0, in other embodiments from about 16.5 to about 28.0, in other embodiments from about 17.0 to about 26.0, in other embodiments from about 17.5 to about 24.0, in other embodiments from about 18.0 to about 22.0, and in other embodiments from about 18.5 to about 21.0 MPa$^{0.5}$ at 25° C.

As the skilled person appreciates, the Hansen Solubility Parameter is based upon empirical evidence relating to the energy from dispersion forces between molecules ($\delta_d$), energy from dipolar intermolecular forces between molecules ($\delta_p$), and energy from hydrogen bonds between molecules ($\delta_h$). These components contribute to a Hansen Total Cohesion Parameter ($\delta_t$). Unless otherwise stated, reference to Hansen Solubility Parameter ($\delta_t$) will refer to the Hansen Total Cohesion Parameter. Further explanation and the Hansen Solubility Parameters ($\delta_t$) of many common organic molecules are provided in the Handbook of Solubility Parameters and Other Cohesion Parameters, CRC Press, Pages 95-121, which is incorporated herein by reference.

In one or more embodiments, the blowing agent additive is also characterized by a boiling point, at one atmosphere, of less than 150° C., in other embodiments less than 130° C., in other embodiments less than 115° C., in other embodiments less than 100° C., in other embodiments less than 90° C., and in other embodiments less than 80° C. In these or other embodiments, the blowing agent additive is also characterized by a boiling point, at one atmosphere, that is greater than 5° C., in other embodiments greater than 10° C., in other embodiments greater than 12° C., in other embodiments greater than 15° C., and in other embodiments greater than 18° C. In one or more embodiments, the blowing agent additive is characterized by a boiling point, at one atmosphere, of from about 5° C. to 150° C., in other embodiments from about 10° C. to 130° C., in other embodiments from about 12° C. to 115° C., in other embodiments from about 15° C. to 100° C., and in other embodiments from about 18° C. to 90° C.

In one or more embodiments, the blowing agent additive may be selected from ketones, aldehydes, ethers, esters, chlorinated hydrocarbons, and aromatics.

In particular embodiments the blowing agent additive includes a low molecular weight aldehyde or ketone.

In one or more embodiments, the low molecular weight aldehydes or ketones may be defined by one of the following formulae R(CO)R or R(CO)H, where R and R are independently an organic group having from one to about 12 carbon atoms, in other embodiments from about one to about 6 carbon atoms, in other embodiments from about one to about 3 carbon atoms, and in other embodiments from about one to about 2 carbon atoms. In other embodiments, R and R join to form a divalent organic group having from one to about 12 carbon atoms, in other embodiments from about one to about 8 carbon atoms, and in other embodiments from about one to about 5 carbon atoms.

Useful ketones include, but are not limited to, acetone, acetophenone, butanone, cyclopentanone, ethyl isopropyl ketone, 2-hexanone, isophorone, mesityl oxide, methyl isobutyl ketone, methyl isopropyl ketone, 3-methyl-2-pentanone, 2-pentanone, 3-pentanone, and methyl ethyl ketone.

Useful aldehydes include, but are not limited to, formaldehyde, acetaldehyde, propionaldehyde, butyraldehyde, benzaldehyde, cinnamaldehyde, glyoxal, malondialdehyde, and succindialdehyde.

In one or more embodiments, the ester may be defined by R(CO)OR', where R is hydrogen or a monovalent organic group and R' is a monovalent organic group, or where R and R' join to form a divalent organic group. The monovalent and divalent organic groups are defined above together with their respective size, which definition is applicable for this embodiment.

Useful esters include, but are not limited to, methyl formate, ethyl formate, n-propyl formate, isopropyl formate, n-butyl formate, isobutyl formate, t-butyl formate, methyl acetate, ethyl acetate, n-propyl acetate, isopropyl acetate, n-butyl acetate, isobutyl acetate, t-butyl acetate, methyl propanoate, ethyl propanoate, n-propyl propanoate, isopropyl propanoate, n-butyl propanoate, isobutyl propanoate, t-butyl propanoate, methyl butanoate, ethyl butanoate, n-propyl butanoate, isopropyl butanoate, n-butyl butanoate, isobutyl butanoate, and t-butyl butanoate.

In one or more embodiments, useful aromatic hydrocarbons include arene and heteroarene compounds. In one or more embodiments, these compounds includes less than 20 carbon atoms, in other embodiments less than 12 carbon atoms, and in other embodiments less than 8 carbon atoms.

Useful arenes include, but are not limited to, benzene, toluene, ethylbenzene, p-1, 2-dimethylbenzene, 1,4-dimethylbenzene, 1,4-dimethylbenzene, mesitylene, durene, 2-phenylhexane, biphenyl, phenol, aniline, nitrobenzene, and naphthalene. Useful heteroarenes include, but are not limited to, azepine, oxepine, theipine, pyridine, pyran, and thiopyran.

In one or more embodiments, the halogenated hydrocarbon may be defined by the general formula $RX_y$, where R is a monovalent organic group, each X is independently a halogen atom, and y is the number of halogen atoms within the molecule. In one or more embodiments, X is selected from chlorine and fluorine atoms. In one or more embodiments, y is 1 to about 5, in other embodiments y is 2 to 4, and in other embodiments y is 2 to 3. The monovalent and divalent organic groups are defined above together with their respective size, which definition is applicable for this embodiment.

In one or more embodiments, the halogenated hydrocarbon is a halogenated methane, also referred to as a halomethane. In other embodiments, the halogenated hydrocarbon is a halogenated ethane (haloethane), and in other embodiments a halogenated propane (halopropane). In yet other embodiments, the halogenated hydrocarbon is a halogenated olefin (haloolefin).

Examples of useful halomethanes include chlorinated methanes such as, but not limited to, chloroform, methyl chloride, 1,2-dicholorethane, and dichloromethane.

In one or more embodiments, the ethers may be defined by the formula R-O-R, where each R is independently a monovalent organic group or each R join to form a divalent organic group. The monovalent and divalent organic groups are defined above together with their respective size, which definition is applicable for this embodiment.

Useful ethers include dihydrocarbyl ether, diethers, and cyclic ethers. Examples of useful dihydrocarbyl ethers include, but are not limited to, diethyl ether, dimethylether, diisopropyl ether, diisobutyl ether, di-n-propyl ether, di-isoamyl ether, di-n-butyl ether, and di-n-hexyl either. Examples of useful cyclic ethers include, but are not limited to, ethylene oxide, tetrahydrofuran (THF), tetrahydropyran, furan, and dihydropyran. Examples of useful diethers include, but are not limited to, dimethoxymethane, dimethoxyethane, dimethoxypropane, dimethoxyisopropane, diethoxymethane, diethoxyethane, diethoxypropane, diethoxyisopropane, dipropoxymethane, dipropoxyethane, dipropoxypropane, dipropoxyisopropane, and diethylene glycol dimethyl ether.

Amount of Reactants/Ingredients

An isocyanurate is a trimeric reaction product of three isocyanates forming a six-membered ring. The ratio of the equivalence of NCO groups (provided by the isocyanate-containing compound or A-side) to isocyanate-reactive groups (provided by the isocyanate-containing compound or B side) may be referred to as the index or ISO index. When the NCO equivalence to the isocyanate-reactive group equivalence is equal, then the index is 1.00, which is referred to as an index of 100, and the mixture is said to be stoiciometrically equal. As the ratio of NCO equivalence to isocyanate-reactive groups equivalence increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages. For purposes of this specification, reference to polyisocyanurate and polyurethane will be used interchangeably unless a specific ISO index is referenced.

In one or more embodiments, the concentration of the isocyanate-containing compound to the isocyanate-reactive compounds within the respective A-side and B-side streams is adjusted to provide the foam product with an ISO index of at least 150, in other embodiments at least 170, in other embodiments at least 190, in other embodiments at least 210, in other embodiments at least 220, in other embodiments at least 225, in other embodiments at least 230, in other embodiments at least 235, in other embodiments at least 240, in other embodiments at least 245, and in other embodiments at least 250. In these or other embodiments, the concentration of the isocyanate-containing compound to the isocyanate-reactive compounds within the respective A-side and B-side streams is adjusted to provide the foam product with an ISO index of at most 400, in other embodiments at most 350, and in other embodiments at most 300. In one or more embodiments, the concentration of the isocyanate-containing compound to the isocyanate-reactive compounds within the respective A-side and B-side streams is adjusted to provide the foam product with an ISO index of from about 150 to about 400, in other embodiments from about 170 to about 350, and in other embodiments from about 190 to about 330, and in other embodiments from about 220 to about 280.

In one or more embodiments, the amount of isopentane used in the manufacture of polyisocyanurate foam construction board according to the present invention may be described with reference to the amount of isocyanate-reactive compound employed (e.g., polyol). For example, in one or more embodiments, at least 12, in other embodiments at least 14, and in other embodiments at least 18 parts by weight isopentane per 100 parts by weight of polyol may be used. In these or other embodiments, at most 40, in other embodiments at most 36, and in other embodiments at most 33 parts by weight isopentane per 100 parts by weight of polyol may be used. In one or more embodiments, from about 12 to about 40, in other embodiments from about 14 to about 36, and in other embodiments from about 18 to about 33 of isopentane per 100 parts by weight of polyol may be used.

In one or more embodiments, the amount of the blowing agent additive may be described as a percentage of the amount of blowing agent employed (in other words, the blowing agent additive replaces a portion of the blowing agent and this amount is described with reference to the total weight of the isopentane and blowing agent additive). Thus, in one or more embodiments, the amount of blowing agent additive included within the foam-forming ingredients is greater than 5 wt %, in other embodiments greater than 10 wt %, and in other embodiments greater than 12 wt % based upon the entire weight of the blowing agent (i.e. total weight of isopentane and blowing agent additive). In these or other embodiments, the amount of blowing agent additive employed is less than 50 wt %, in other embodiments less than 25 wt %, and in other embodiments less than 20 wt % based upon the entire weight of the blowing agent. In one or more embodiments, from about 5 to about 50 wt %, in other embodiments from about 10 to about 25 wt %, and in other embodiments from about 12 to about 20 wt % blowing agent additive, based upon the entire weight of the blowing agent, is included within the foam-forming ingredients. It should be understood that these amounts can likewise be employed even where the blowing agent additive are introduced directly to the mixhead, as will be explained in greater detail below.

In one or more embodiments, the amount of the blowing agent additive may be described as a function of the weight of the polyol. Thus, in one or more embodiments, the amount of blowing agent additive included within the foam-forming ingredients is greater than 0.9 parts by weight, in other embodiments greater than 2.0 parts by weight, and in other embodiments greater than 3.3 parts by weight per 100 parts by weight polyol. In these or other embodiments, the amount of blowing agent additive is less than 10.0, in other embodiments less than 6.0, and in other embodiments less than 5.0 parts by weight blowing agent additive per 100 parts by weight polyol. In one or more embodiments from about 0.9 to about 10.0, in other embodiments from about 2.0 to about 6.0, and in other embodiments from about 3.3 to about 5.0 parts by weight blowing agent additive per 100 parts by weight polyol is included within the foam-forming ingredients.

In one or more embodiments, the amount of the blowing agent additive may be described in terms of a molar ratio of blowing agent additive to isopentane, which is defined in terms of the moles of blowing agent additive to moles of isopentane. Thus, in one or more embodiments, the molar ratio of blowing agent additive to isopentane is greater than 1:20, in other embodiments greater than 1:10, and in other embodiments greater than 1:4. In these or other embodiments, the molar ratio of blowing agent additive to isopentane is less than 1:1, in other embodiments less than 1:1.5, and in other embodiments less than 1:2. In one or more embodiments, the molar ratio of blowing agent additive to isopentane is from about 1:20 to about 1:1, in other embodiments from about 1:10 to about 1:1.5, and in other embodiments from about 1:4 to about 2:1. It should be understood that these amounts can likewise be employed even where the blowing agent additive are introduced directly to the mixhead, as will be explained in greater detail below.

In one or more embodiments, the amount of surfactant (e.g., silicone copolymer) used in the manufacture of polyisocyanurate foam construction board according to the present invention may be described with reference to the amount of isocyanate-reactive compound employed (e.g. polyol). For example, in one or more embodiments, at least 1.0, in other embodiments at least 1.5, and in other embodiments at least 2.0 parts by weight surfactant per 100 parts by weight of polyol may be used. In these or other embodiments, at most 5.0, in other embodiments at most 4.0, and in other embodiments at most 3.0 parts by weight surfactant per 100 parts by weight of polyol may be used. In one or more embodiments, from about 1.0 to about 5.0, in other embodiments from about 1.5 to about 4.0, and in other embodiments from about 2.0 to about 3.0 of surfactant per 100 parts by weight of polyol may be used.

In one or more embodiments, the amount of flame retardant (e.g., liquid phosphates) used in the manufacture of polyisocyanurate foam construction board according to the present invention may be described with reference to the amount of isocyanate-reactive compound employed (e.g., polyol). For example, in one or more embodiments, at least 5, in other embodiments at least 10, and in other embodiments at least 12 parts by weight flame retardant per 100 parts by weight of polyol may be used. In these or other embodiments, at most 30, in other embodiments at most 25, and in other embodiments at most 20 parts by weight flame retardant per 100 parts by weight of polyol may be used. In one or more embodiments, from about 5 to about 30, in other embodiments from about 10 to about 25, and in other embodiments from about 12 to about 20 of flame retardant per 100 parts by weight of polyol may be used.

In one or more embodiments, the amount of catalyst(s) employed in practice of the present invention can be readily determined by the skilled person without undue experimentation or calculation. Indeed, the skilled person is aware of the various process parameters that will impact the amount of desired catalyst.

In one or more embodiments, the amount of blowing agent (i.e. total amount of isopentane and blowing agent additive) that is employed is sufficient to provide a foam having a foam density (ASTM C303) that is less than 2.5 pounds per cubic foot (12 kg/m2), in other embodiments less than 2.0 pounds per cubic foot (9.8 kg/m2), in other embodiments less than 1.9 pounds per cubic foot (9.3 kg/m2), and still in other embodiments less than 1.8 pounds per cubic foot (8.8 kg/m2). In one or more embodiments, the amount of blowing agent (together with the amount of blowing agent additives) that is employed is sufficient to provide a density that is greater than 1.50 pounds per cubic foot (7.32 kg/m2), or in other embodiments, greater than 1.55 pounds per cubic foot (7.57 kg/m2).

Threshold Amounts of Water

In one or more embodiments, the foam-forming ingredients include threshold amounts of water. In other words, the form-forming ingredients include isopentane, blowing agent additive, and a threshold amount of water. In one or more embodiments, the threshold amount of water is included within the B-side steam of reactants. In one or more embodiments, the threshold amount of water includes greater than 0.5, in other embodiments greater than 0.75, and in other embodiments greater than 1.0 parts by weight water per 100 parts by weight polyol. In these or other embodiments, the threshold amount of water includes less than 3.0, in other embodiments less than 2.5, and in other embodiments less than 2.0 parts by weight water per 100 parts by weight polyol. In one or more embodiments, the amount of water included within the included within the B-side stream of reactants is from about 0.5 to about 3.0, in other embodiments from about 0.75 to about 2.5, and in other embodiments from about 1.0 to about 2.0 parts by weight water per 100 parts by weight polyol. It should be understood that these amounts can likewise be employed even where the water is introduced directly to the mixhead.

Method of Making

Figure 1:
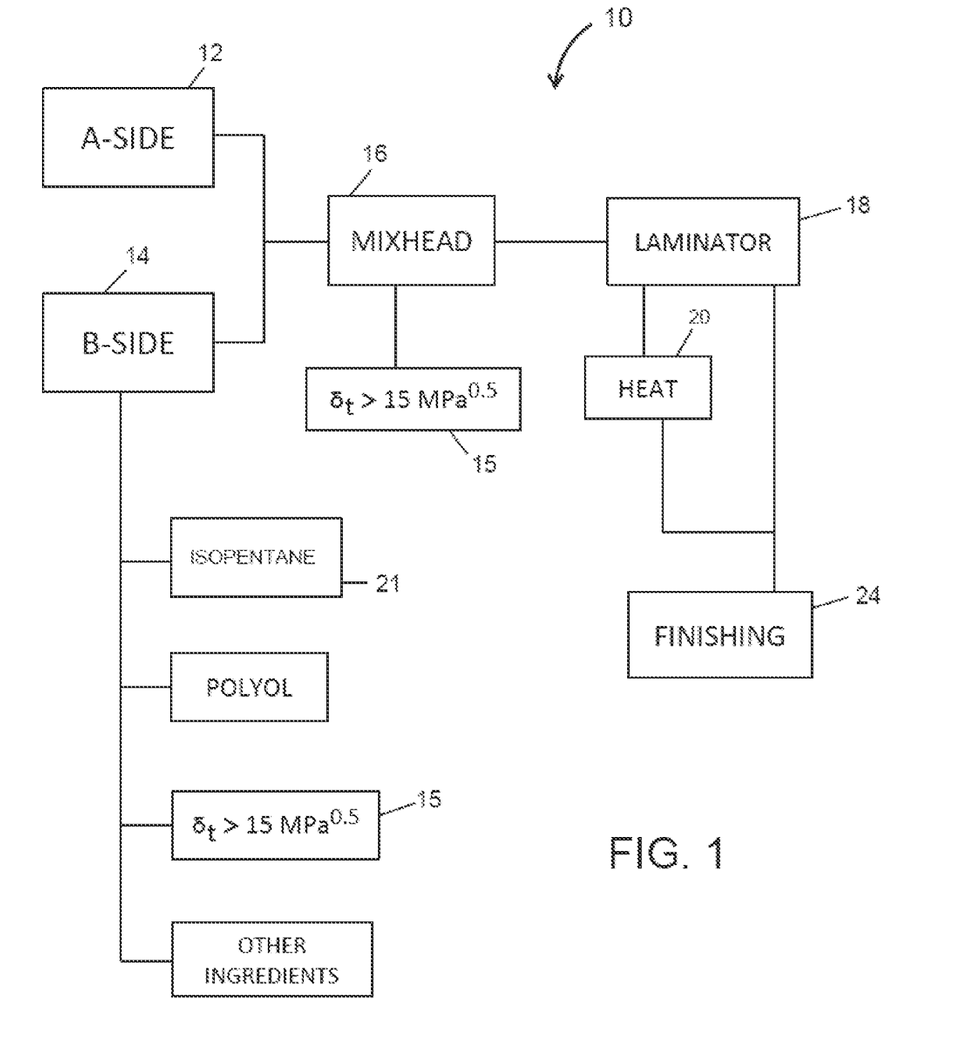
FIG. 1 is a flow chart showing a process of one or more embodiments of the invention.

An overview of a process according to embodiments of the present invention can be described with reference to FIG.

1. The process 10 includes providing an A-side stream of reactants 12 and a B-side stream of reactants 14. As described above, the A-side stream of reactants includes an isocyanate-containing compounds and the B-side stream of reactants includes an isocyanate-reactive compound. A-side 12 and B-side 14 may be combined at mixhead 16.

In one or more embodiments, isopentane 21 and the blowing agent additive 15 are included within the B-side stream. Also, in optional embodiments, a threshold amount of water 17 is included in the B-side. The order in which the ingredients are added in forming the B-side stream can be varied. And, the timing of the addition of the blowing agent additive can be varied. For example, in one or more embodiments, blowing agent additive is combined with the polyol 16 within a batch mixer together with one or more of the other ingredients except for the isopentane. Once this initial mixture is prepared, isopentane 21 can be added to the mixture to form the B-side stream. The skilled person will readily appreciate other orders of addition that can be employed. In other embodiments, blowing agent additive 15 can be introduced directly to mixhead 16, where it is simultaneously introduced to the A-side and B-side stream of reactants.

In one or more embodiments, the blowing agent additive (and optionally the threshold amount of water) is preblended with one or more constituents of the foam foaming ingredients. For example, the blowing agent additive may be preblended with the isopentane and the blend is then introduced into the process for forming a foam as described herein.

In one or more embodiments, a blowing agent additive and isopentane are introduced to the B-side stream of reactants by using an in-line continuous mixer at a pressure of less than 3,400 kPa. In one or more embodiments, the blowing agent additive and isopentane are introduced to the B-side stream of reactants at pressures greater than 200 kPa, in other embodiments greater than 400 kPa, and in other embodiments greater than 600 kPa. In these or other embodiments, the blowing agent additive and isopentane are introduced to the B-side stream of reactants at pressures less than 3,000 kPa, in other embodiments less than 2,700 kPa, and in other embodiments less than 2,500 kPa. In one or more embodiments, the blowing agent additive, isopentane, and the polyol component are continuously charged in separate streams advanced at predetermined flow rates chosen to bring about a desired ratio of isopentane and blowing agent additive to polyol component within the in-line mixer. In one or more embodiments, the isopentane, blowing agent additive and the polyol are mixed at pressure of a less than 3,400 kPa to dissolve or emulsify the isopentane and blowing agent additive within the B-side stream. Methods by which the isopentane and blowing agent additive may be introduced to the B-side stream include those methods for introducing other constituents to the B-side stream, and in this regard, U.S. Publication No. 2004/0082676 is incorporated herein by reference.

In one or more embodiments, a blowing agent additive is introduced to the B-side stream (i.e., combined with the polyol) prior to introducing the isopentane to the B-side stream. In these or other embodiments, a blowing agent additive is introduced to the B-side stream (i.e., combined with the polyol) after introducing the isopentane to the B-side stream. In these or embodiments, a blowing agent additive is introduced to the B-side stream (i.e., combined with the polyol) simultaneously with the isopentane. As suggested above, in alternate embodiments, which are also shown in FIG. 1, the blowing agent additive can be included in the A-side, either exclusively or in combination with addition to the B-side or in addition to inclusion at the mixhead.

The respective streams (12, 14) are mixed within, for example, a mixhead 16 to produce a reaction mixture. Embodiments of the present invention are not limited by the type of mixing or device employed to mix the A-side stream and the B-side stream. In one or more embodiments, the A-side stream of reactants and the B-side stream of reactants may be mixed within an impingement mixhead. In particular embodiments, mixing takes place at a temperature of from about 5 to about 45° C. In these or other embodiments, mixing takes place at a pressure in excess of 1,000, in other embodiments in excess of 1,500, and in other embodiments in excess of 2,000 psi.

The mixture can then be deposited onto a facer that is positioned within and carried by a laminator 18. While in laminator 18, the reaction mixture rises and can be married to a second facer to form a composite, which may also be referred to as a laminate, wherein the foam is sandwiched between upper and lower facers. The composite, while in laminator 18, or after removal from laminator 18, is exposed to heat that may be supplied by, for example, oven 20. For example, laminator 18 may include an oven or hot air source that heats the slats and side plates of the laminator and there through transfers heat to the laminate (i.e., to the reaction mixture).

Once subjected to this heat, the composite (i.e., the reaction mixture), or a portion of the composite (i.e., reaction mixture) can undergo conventional finishing within a finishing station 24, which may include, but is not limited to, trimming and cutting.

Figure 2:
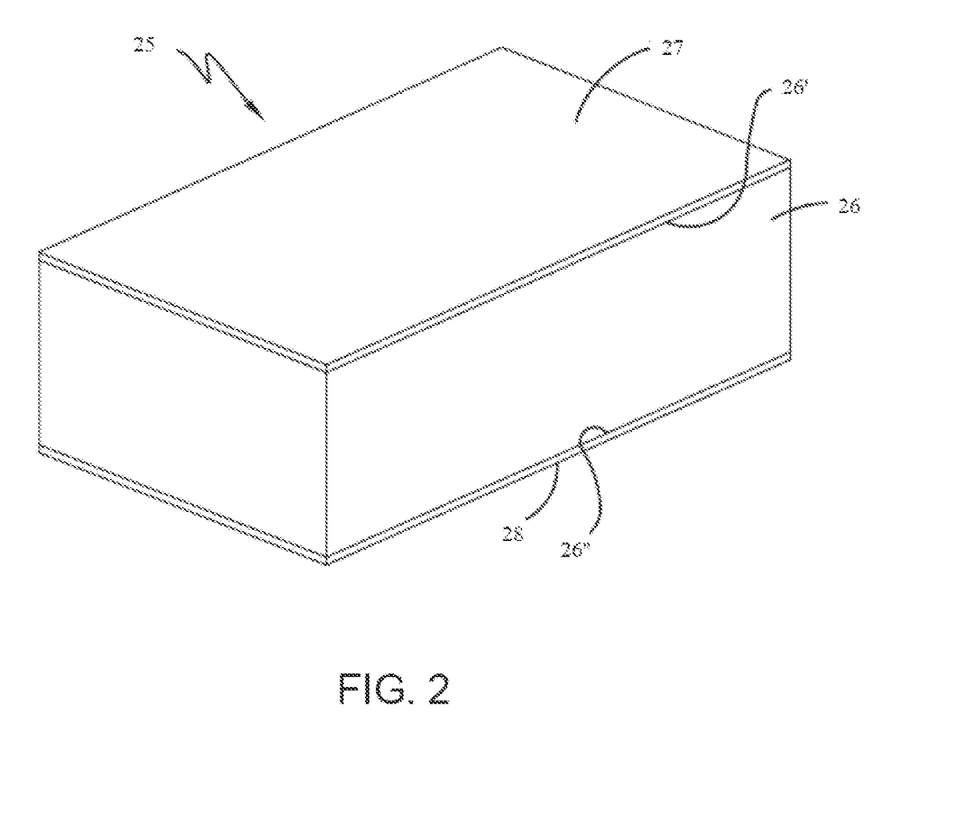
FIG. 2 is a perspective view of a construction board of one or more embodiments of the present invention.

Construction boards produced according to one or more embodiments of the present invention may be described with reference to FIG. 2., which shows a construction board that is indicated generally by the numeral 25. Construction board 25 includes a foam layer 26, which may be referred to as foam core 26, sandwiched between first facer 27 and optional second facer 28. Facers 27 and 28 are attached to foam layer 26 at first planar surface 26' and second planar surface 26", respectively, of foam layer 26. In one or more embodiments, facer 27 (and optionally facer 28) are continuous over the entire planar surface 26' (or planar surface 26") of foam core 26. In one or more embodiments, the isopentane and blowing agent additive are contained within layer 26 either within the cellular structure and/or contained within the cellular walls that form the foam matrix.

INDUSTRIAL APPLICABILITY

In one or more embodiments, the construction boards of this invention may be employed in roofing or wall applications. In particular embodiments, the construction boards are used in flat or low-slope roofing system.

Figure 3:
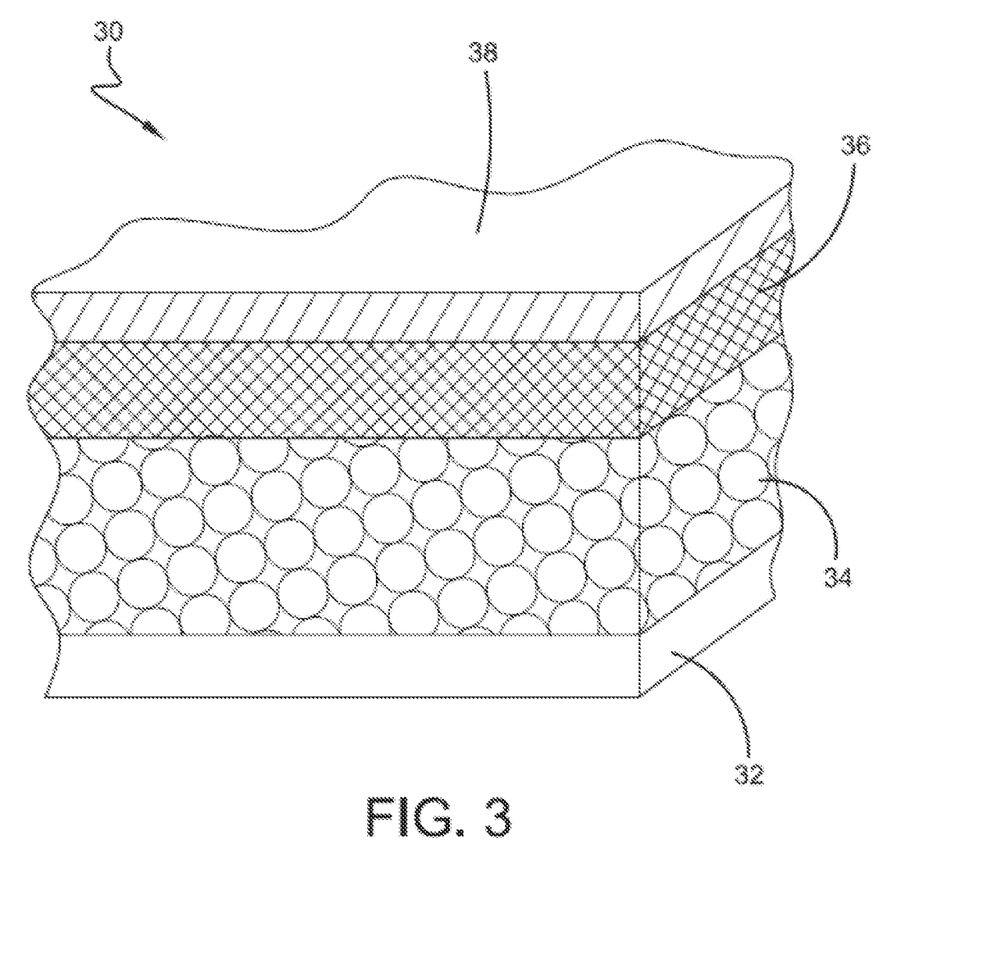
FIG. 3 is a perspective view of a roofing system including one or more construction boards according to practice of one or more embodiments of the present invention.

As shown in FIG. 3, roofing system 30 includes a roof deck 32 having insulation board 34, which may be fabricated according to practice of this invention, disposed thereon. An optional high density board 36, which may also be fabricated according to practice of this invention, positioned above, relative to the roof deck, insulation board 34. A water-protective layer or membrane 38 is disposed on top or above high density board 36. In alternate embodiments, not shown, optional high density board 36 may be below insulation board 34 relative to the roof deck.

Practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5,703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579,921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g. the roof deck). In other embodiments, the construction boards can be adhesively secured to the building structure.

Various modifications and alterations that do not depart from the scope and spirit of this invention will become apparent to those skilled in the art. This invention is not to be duly limited to the illustrative embodiments set forth herein.

What is claimed is:

1. A construction board comprising:
(i) a foam body having a generally planar shape with first and second planar surfaces, where said foam body is a closed-cell foam body including isopentane and a blowing agent additive contained within the foam body, where the blowing agent additive has a Hansen Solubility Parameter of from 17.0 to 35.0 $MPa^{-0.5}$, where the blowing agent additive has a boiling point, at one atmosphere, of less than 150° C., where said blowing agent additive is selected from the group consisting of ketones, aldehydes, ethers, esters, halogenated hydrocarbons, and aromatics, where the closed-cell body is a polyurethane or polyisocyanurate foam body prepared by reacting an isocyanate-containing compound with an aromatic polyester polyol, and where the isocyanate-containing compound and the aromatic polyester polyol are reacted at a molar ratio to provide an iso index of at least 220, and where said reacting an isocyanate-containing compound with an aromatic polyester polyol takes place in the presence of a physical blowing agent mixture that includes the isopentane and the blowing agent additive, where the physical blowing agent mixture includes at least 75 wt % of the isopentane, and where the physical blowing agent mixture is substantially devoid of n-pentane and cyclopentane; and
(ii) first and second facers attached to said first and second planar surfaces, respectively.

2. The construction board of claim 1, where the foam body has a density of 1.0 to 2.5 $lbs/ft^3$.

3. The construction board of claim 1, where the foam body has an index of at least 225 and a density of 1.2 to 2.2 $lbs/ft^3$.

4. The construction board of claim 1, where the blowing agent additive has a Hansen Solubility Parameter of from 17.5 to 28.0 $MPa^{-0.5}$.

5. The construction board of claim 1, where the blowing agent additive has a Hansen Solubility Parameter that of from 19.0 to 35.0 $MP^{-0.5}$.

6. The construction board of claim 1, where the blowing agent additive has a boiling point, at one atmosphere, of greater than 5° C.

7. The construction board of claim 1, where blowing agent additive and the isopentane are provided in amounts to provide a molar ratio of the blowing agent additive to the isopentane of from about 1:20 to about 1:1.

8. The construction board of claim 1, where blowing agent additive and the isopentane are provided in amounts to provide a molar ratio of the blowing agent additive to the isopentane of from about 1:4 to about 2:1.

9. The construction board of claim 1, where the blowing agent additive is an aldehyde or a ketone.

10. The construction board of claim 9, where the blowing agent additive is a ketone selected from the group consisting of acetone, acetophenone, butanone, cyclopentanone, ethyl isopropyl ketone, 2-hexanone, isophorone, mesityl oxide, methyl isobutyl ketone, methyl isopropyl ketone, 3-methyl-2-pentanone, 2-pentanone, 3-pentanone, and methyl ethyl ketone.

11. The construction board of claim 10, where the blowing agent additive is acetone.

12. The construction board of claim 9, where the blowing agent additive is an aldehyde selected from the group consisting of formaldehyde, acetaldehyde, propionaldehyde, butyraldehyde, benzaldehyde, cinnamaldehyde, glyoxal, malondialdehyde, and succindialdehyde.

13. The construction board of claim 1, where the blowing agent additive is an ester.

14. The construction board of claim 13, where the blowing agent additive is an ester selected from the group consisting of methyl formate, ethyl formate, n-propyl formate, isopropyl formate, n-butyl formate, isobutyl formate, t-butyl formate, methyl acetate, ethyl acetate, n-propyl acetate, isopropyl acetate, n-butyl acetate, isobutyl acetate, t-butyl acetate, methyl propanoate, ethyl propanoate, n-propyl propanoate, isopropyl propanoate, n-butyl propanoate, isobutyl propanoate, t-butyl propanoate, methyl butanoate, ethyl butanoate, n-propyl butanoate, isopropyl butanoate, n-butyl butanoate, isobutyl butanoate, and t-butyl butanoate.

15. The construction board of claim 1, where the blowing agent additive is an ether.

16. The construction board of claim 1, where the blowing agent additive is a halogenated hydrocarbon.

17. The construction board of claim 1, where the blowing agent additive is an aromatic compound.

18. The construction board of claim 1, where the physical blowing agent mixture includes at least 80 wt % isopentane.

19. The construction board of claim 1, where the physical blowing agent mixture includes at least 90 wt % isopentane.

20. The construction board of claim 1, where the foam body is devoid of cyclopentane and n-pentane.

21. The construction board of claim 1, where the physical blowing agent mixture includes from about 7 to about 35 mole % of the blowing agent additive based on the total moles of physical blowing agent mixture.

22. The construction board of claim 21, where the isopentane and the blowing agent additive form a physical blowing agent mixture, and where the physical blowing agent mixture includes from about 10 to about 30 mole % of the blowing agent additive based on the total moles of physical blowing agent mixture.

* * * * *